(12) United States Patent
Rabinowitz et al.

(10) Patent No.: US 9,349,152 B2
(45) Date of Patent: May 24, 2016

(54) IMAGE IDENTIFIERS AND METHODS AND SYSTEMS OF PRESENTING IMAGE IDENTIFIERS

(71) Applicant: Simetricka Systems Ltd., Ramat-Gan (IL)

(72) Inventors: Nitzan Rabinowitz, Rosh HaAyin (IL); Joseph Agassi, Herzlia (IL); Ruth Heymann, Ramat-Gan (IL)

(73) Assignee: Simetricka Systems Ltd., Ramat-Gan (IL)

( * ) Notice: Subject to any disclaimer, the term of this patent is extended or adjusted under 35 U.S.C. 154(b) by 48 days.

(21) Appl. No.: 14/044,034

(22) Filed: Oct. 2, 2013

(65) Prior Publication Data

US 2014/0093122 A1 Apr. 3, 2014

Related U.S. Application Data

(60) Provisional application No. 61/708,669, filed on Oct. 2, 2012.

(51) Int. Cl.
| | |
|---|---|
| *G06K 9/00* | (2006.01) |
| *G06T 1/00* | (2006.01) |
| *G06K 9/62* | (2006.01) |
| *G06K 9/46* | (2006.01) |
| *G06F 17/30* | (2006.01) |

(52) U.S. Cl.
CPC ........ *G06T 1/0021* (2013.01); *G06F 17/30259* (2013.01); *G06K 9/4638* (2013.01); *G06K 9/4676* (2013.01); *G06K 9/6218* (2013.01)

(58) Field of Classification Search
CPC . G06K 9/6218; G06K 9/4638; G06K 9/4676; G06T 1/0021
See application file for complete search history.

(56) References Cited

U.S. PATENT DOCUMENTS

| | | | |
|---|---|---|---|
| 2007/0008317 A1* | 1/2007 | Lundstrom | 345/424 |
| 2009/0010500 A1* | 1/2009 | Kandaswamy et al. | 382/118 |
| 2013/0117676 A1* | 5/2013 | De Pauw et al. | 715/738 |

* cited by examiner

*Primary Examiner* — Tom Y Lu

(57) ABSTRACT

A method of creating an image identifier of a target image. The method comprises providing a target image, identifying a plurality of connected component clusters in the target image, each the connected component cluster comprises a plurality of neighboring pixels having at least one common property, calculating a center of gravity for each the connected component cluster, generating an image identifier of the target image by using a plurality of elements to map the connected component clusters in a space, each the element represents a respective the at least one common property, a respective the center of gravity, and a size which corresponds with a number of the plurality of neighboring pixels of the respective the connected component cluster, and outputting the image identifier.

14 Claims, 14 Drawing Sheets
(8 of 14 Drawing Sheet(s) Filed in Color)

FIG. 7A
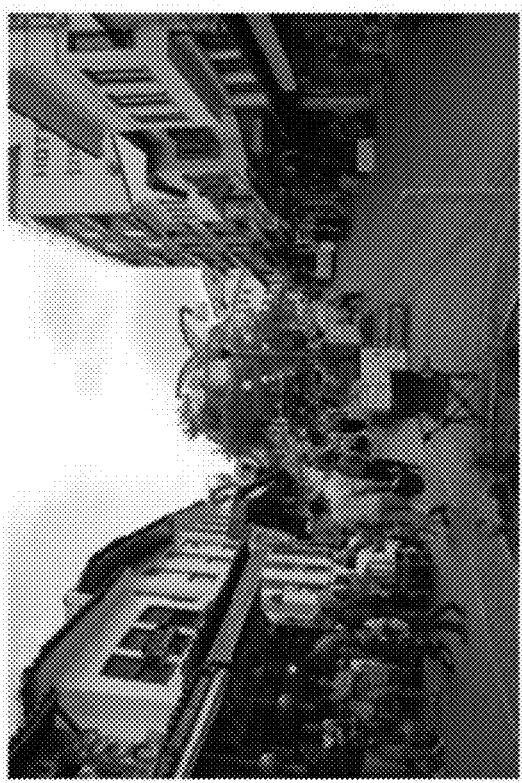
FIG. 7C
FIG. 7B
FIG. 7D

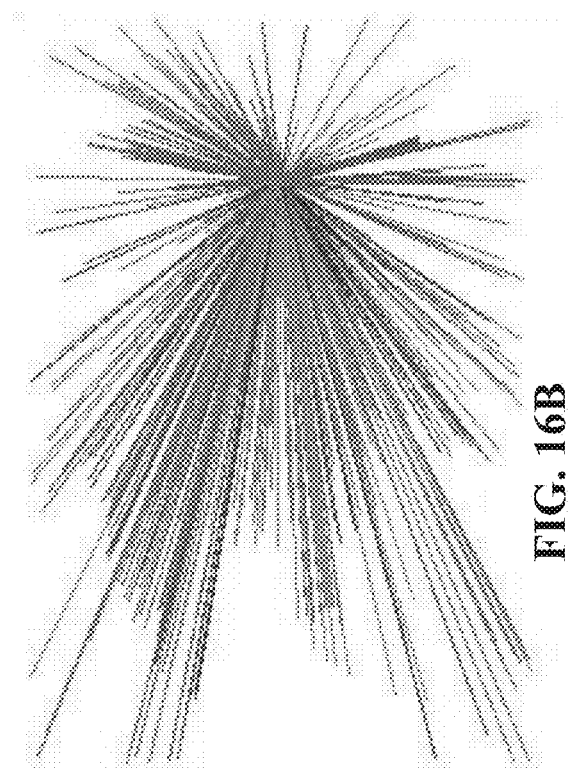
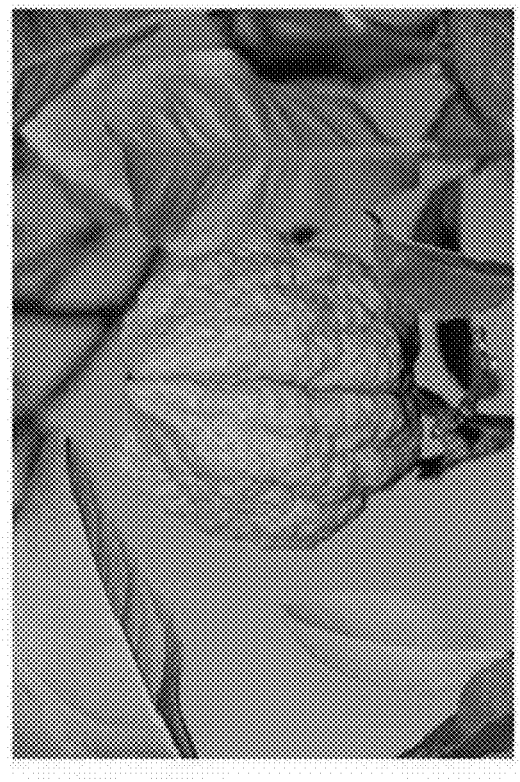

IMAGE IDENTIFIERS AND METHODS AND SYSTEMS OF PRESENTING IMAGE IDENTIFIERS

RELATED APPLICATION

This application claims the benefit of priority under 35 USC 119(e) of U.S. Provisional Patent Application No. 61/708,669 filed Oct. 2, 2012, the contents of which are incorporated herein by reference in their entirety.

BACKGROUND

The present invention, in some embodiments thereof, relates to image representation and, more specifically, but not exclusively, to image identifiers, methods and systems of presenting image identifiers, and analysis image identifiers for object detection.

Connected component analysis, also referred to as blob extraction, region labeling, blob discovery, or region extraction, is an algorithmic application of graph theory, where subsets of connected components are uniquely labeled based on a given heuristic.

Connected-component labeling is used in computer vision to detect connected regions in binary digital images, although color images and data with higher-dimensionality can also be processed. When integrated into an image recognition system or human-computer interaction interface, connected component labeling can operate on a variety of information.

SUMMARY

According to some embodiments of the present invention, there is provided a method of creating an image identifier of a target image. The method comprises providing a target image, identifying a plurality of connected component clusters in the target image, each connected component cluster comprises a plurality of neighboring pixels having at least one common property, calculating a center of gravity for each connected component cluster, generating an image identifier of the target image by using a plurality of elements to map the connected component clusters in a space, each element represents a respective the at least one common property, a respective the center of gravity, and a size which corresponds with a number of the plurality of neighboring pixels of the respective the connected component cluster, and outputting the image identifier.

Optionally, the image identifier is a graphical representation of the target image wherein each element is represented as an object located in relation to other objects according to the location of a respective the center of gravity, having a visual size which corresponds with the number of neighboring pixels and colored according to the at least one common property.

More optionally, each object is a circular object centered around the respective center of gravity, having a radius which corresponds with the number of neighboring pixels, and colored according to the respective at least one common property.

Optionally, the at least one common property is a color pixel value.

Optionally, the at least one common property is a grayscale pixel value.

Optionally, the method further comprises printing the image identifier and using the printed imager identifier as a fingerprint of the target image.

Optionally, the outputting comprises storing the image identifier as an entry in an index; further comprising matching the image identifier with another image identifier received in a search query and retrieving the target image is match between the image identifier and the another image identifier.

Optionally, the generating comprises uniformly quantizing pixel values in the target image.

Optionally, the image identifier is a graphical representation of the target image wherein each element is represented as a line object located to connect each connected component cluster with a selected point in the target image, the line having a visual size which corresponds with the number of neighboring pixels and colored according to the at least one common property.

Optionally, the generating comprises multiplying values of each element to generate a Goedel number and using the Goedel number as the image identifier.

According to some embodiments of the present invention, there is provided a method of creating an image identifier of a target image. The method comprises providing a target image, identifying a plurality of connected component clusters in the target image, each connected component cluster comprises a plurality of neighboring pixels having at least one common property, calculating a center of gravity for each connected component cluster, identifying a plurality of connecting lines each connecting a pair of members of a cluster group of the connected component clusters, identifying a set of one or more intersection points, each intersection point is identified in a location wherein a line group of the plurality of connecting lines intersect, selecting at least one high resolution point from the set, generating an image identifier by mapping a plurality of distances between the at least one high resolution point and a plurality of centers of gravity of members of the cluster group, and outputting the image identifier.

Optionally, each distance is represented as a visual line spread between the at least one high resolution point and a respective the center of gravity, the visual line having a width corresponds with the number of neighboring pixels, and colored according to the respective at least one common property.

More optionally, the plurality of distances are represented as a plurality of visual lines perpendicular to a common axis, each visual line has a length that corresponds with a respective the distance between the at least one high resolution point and a respective the center of gravity, the plurality of visual lines are ordered according to the respective number of neighboring pixels and colored according to the respective at least one common property.

More optionally, the method further comprises printing the image identifier as a fingerprint of the target image.

According to some embodiments of the present invention, there is provided a method of identifying a match between a target image and at least one of a plurality of images, comprising: providing a dataset having a plurality of image identifiers each associated with one of a plurality of images, receiving a query for matching between a target image and at least one of the plurality of images, generating a target image identifier associated with the target image, identifying a match between the target image identifier and at least one of the plurality of image identifiers, and outputting at least one of the plurality of images according to the match. Each image identifier is generated by identifying in a respective the associated image a plurality of connected component clusters, each connected component cluster comprises a plurality of neighboring pixels having at least one common property, each image identifier having a plurality of elements, each element maps for one of the respective plurality of connected component clusters, a center of gravity, a respective the at least one common property and a size which corresponds with a number of the plurality of neighboring pixels.

According to some embodiments of the present invention, there is provided a system of creating an image identifier of a target image. The system comprises a processor, an image acquiring module providing a target image and a blob mapping module which identifies a plurality of connected component clusters in the target image. Each connected component cluster comprises a plurality of neighboring pixels having at least one common property, calculates, using the processor, a center of gravity for each connected component cluster, and generates an image identifier of the target image by using a plurality of elements to map the connected component clusters in a space, each element represents a respective the at least one common property, a respective the center of gravity, and a size which corresponds with a number of the plurality of neighboring pixels of the respective the connected component cluster.

Optionally, the target image is an image stored to be rendered when a webpage is loaded, the image acquiring module identifies the target image while crawling a plurality of websites.

According to some embodiments of the present invention, there is provided a device of identifying an object. The device comprises a repository which includes a dataset having a plurality of image identifiers each associated with one of a plurality of images, an image sensor which captures a target image, a processor, a image identifier module which generates, using the processor, a target image identifier associated with the target image and identifies a match between the target image identifier and at least one of the plurality of image identifiers and a presentation unit generates an indication according to the match. Each image identifier includes a plurality of elements indicative of a plurality of connected component clusters, each connected component cluster comprises a plurality of neighboring pixels having at least one common property, each element maps for one of the respective plurality of connected component clusters, a center of gravity, a respective the at least one common property and a size which corresponds with a number of the plurality of neighboring pixels.

Optionally, the device is a handheld device having the image identifier module installed as an application.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of generating an image identifier for an image by mapping a plurality of connected component clusters, according to some embodiments of the present invention;

FIG. 2 is a schematic illustration of a system of generating an image identifier for an image, for example by implementing FIG. 1, according to some embodiments of the present invention;

FIGS. 3A-3B are a set of images that respectively includes a painted picture and an image of 8-colors (8 level pixel values) connected component clusters generated from the painted picture, according to some embodiments of the present invention;

FIGS. 4A-4B are a set of images that respectively includes an image captured by a digital camera and an image of 8-colors (8 level pixel values) connected component clusters generated from the image, according to some embodiments of the present invention;

FIGS. 5A-5B are, respectively, a grayscale image, and an image of 4-level pixel value connected component clusters of the grayscale image generated, according to some embodiments of the present invention;

FIG. 6 is a flowchart of a method of identifying one or more images which are similar to a selected image, for example a queried image designated in a search query, according to some embodiment of the present invention;

FIGS. 7A-7D are, respectively, an image to circular blob transform, a graphical representation of an image identifier extracted from the indexed image, a queried image that is a blurred version of the indexed image, and an image identifier extracted from the queried image, according to some embodiment of the present invention;

FIGS. 8A-8B depict, respectively, a grayscale drawing, and a graphical representation of an image identifier with a plurality of circular objects, according to some embodiments of the present invention;

FIG. 9 is a flowchart of another method of generating an image identifier from connected component clusters of pixels having one or more common properties, according to some embodiments of the present invention;

FIG. 10 depicts a high resolution point with the highest number of intersections in a painting, according to some embodiments of the present invention;

FIGS. 11A-11B are images with a high resolution point with the highest number of intersections in an image captured using a digital camera and the same image with a set of high resolution points with the highest number of intersections in this image, according to some embodiments of the present invention;

Figure 12A:
Figure 12C:
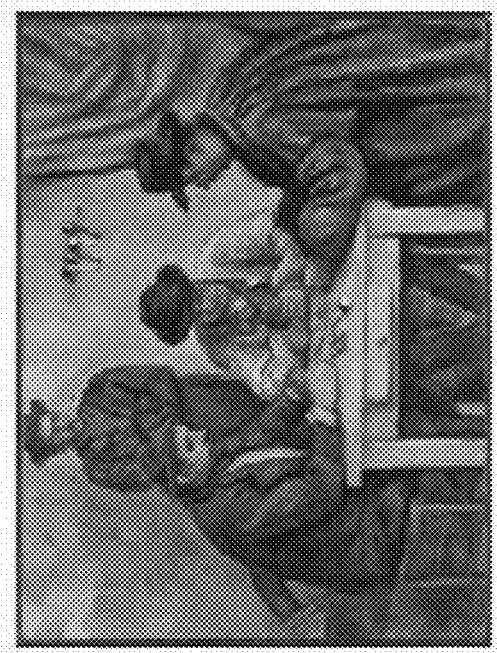
Figure 12B:
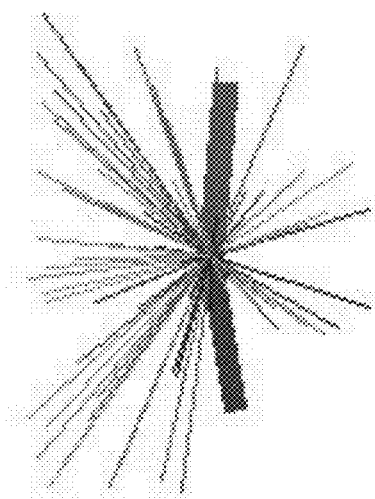
Figure 12D:
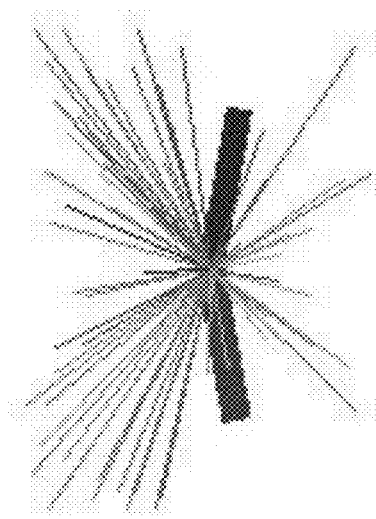
Figure 13A:
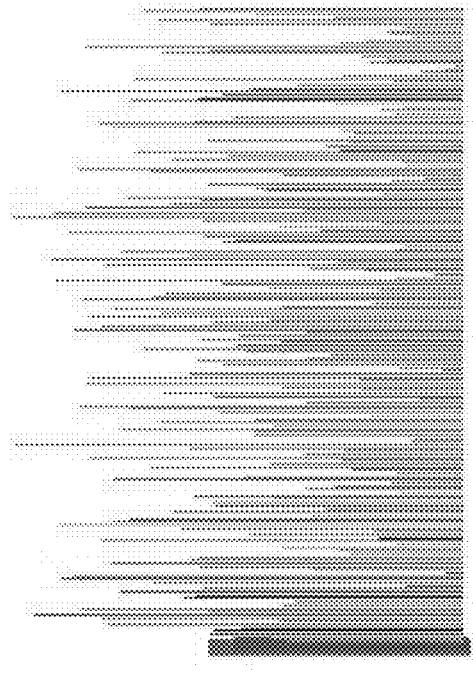
Figure 13C:
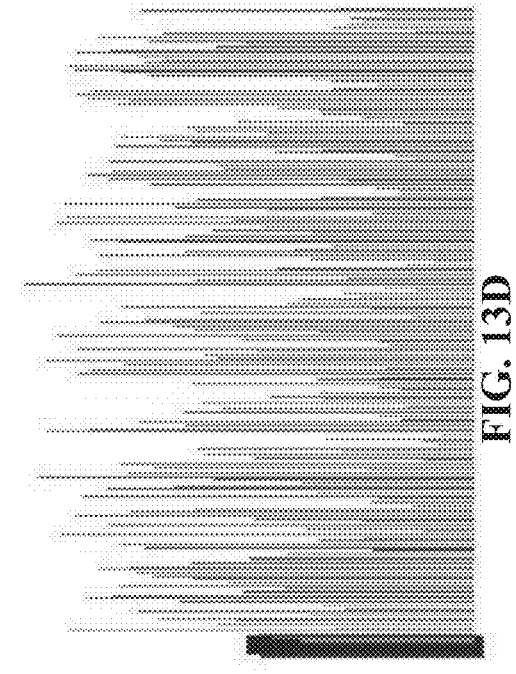
Figure 13B:
Figure 13D:
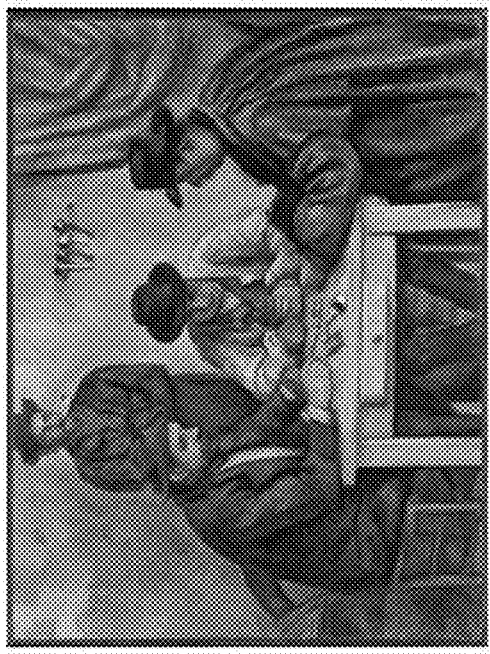
Figure 14A:
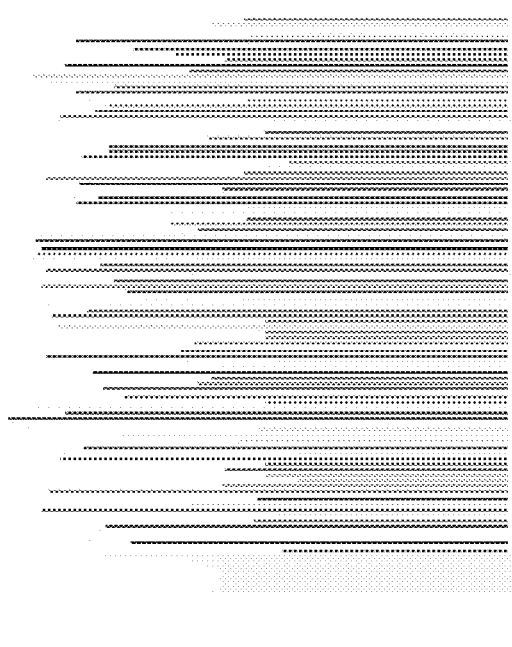
Figure 14B:
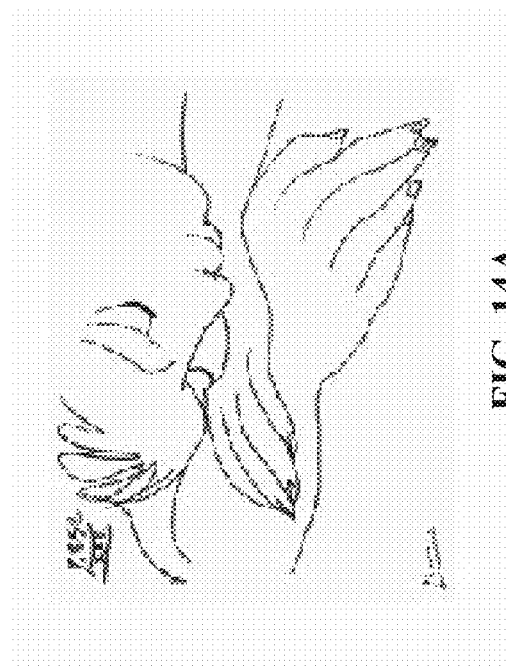
Figure 15A:
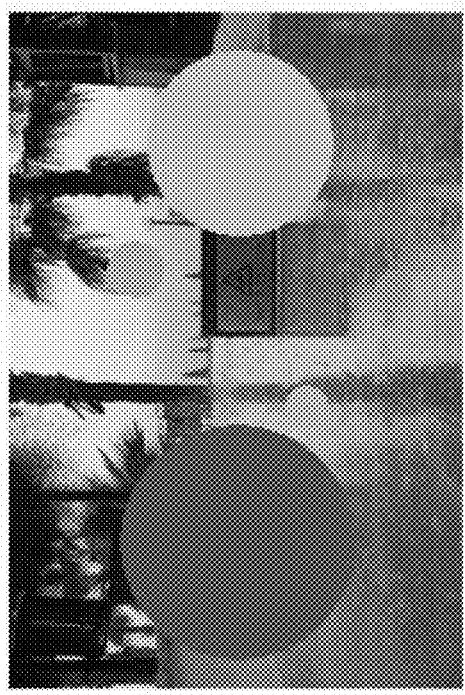
Figure 15B:
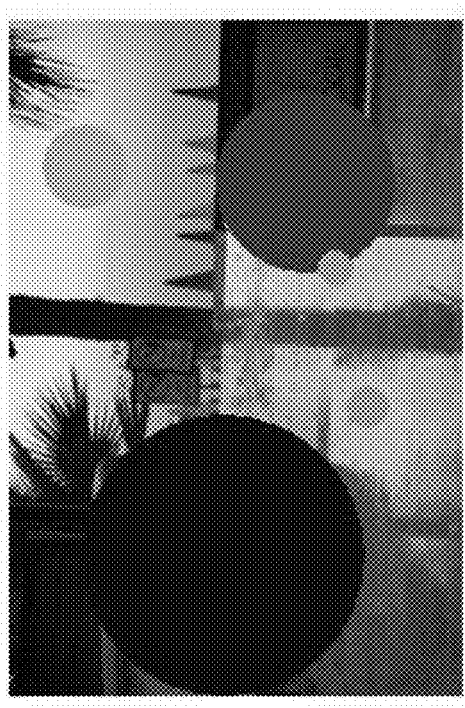

FIGS. 12A-12B are, respectively, a painting, and an image identifier that is derived from the painting, according to some embodiments of the present invention;

FIGS. 12C-12D are, respectively, a painting, and an image identifier that is derived from the painting, according to some embodiments of the present invention;

FIGS. 13A-13D: FIGS. 13C and 13D are image identifiers having lines which are generated from the images depicted in FIGS. 13A and 13B, according to some embodiments of the present invention;

FIGS. 14A-14B: FIG. 14B is an image identifier with gray-level lines ordered according to the size of a respective cluster in grayscale image depicted in FIG. 14A, according to some embodiments of the present invention;

FIGS. 15A-15B are exemplary images of a common scenery, taken from different points of view, according to some embodiments of the present invention; and FIGS. 16A-16B: FIG. 16B is an exemplary barcode, image identifier, generated from the image depicted in FIG. 16A, according to some embodiments of the present invention.

DETAILED DESCRIPTION

The present invention, in some embodiments thereof, relates to image representation and, more specifically, but not exclusively, to image identifiers, methods and systems of presenting image identifiers, and analysis image identifiers for object detection.

According to some embodiments of the present invention, there are provided methods and systems of generating an image identifier of an image by identifying the center of gravity and size of a plurality of connected components in the image and mapping these properties to map the connected components. Optionally, the image identifier mapping is performed using a plurality of objects, for example circular and/or lines. Optionally, the image identifier is used as a fingerprint of the image, for example placed in an image catalog and/or printed as placed to indicate the identity of the image, for example as a barcode.

The methods and systems which are described below and outlined above allow reducing the computational complexity of matching images, for example during an image search. The generation of a dataset wherein a plurality of images are associated with a plurality of image identifiers allows scanning multiple images by a simple vector match.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
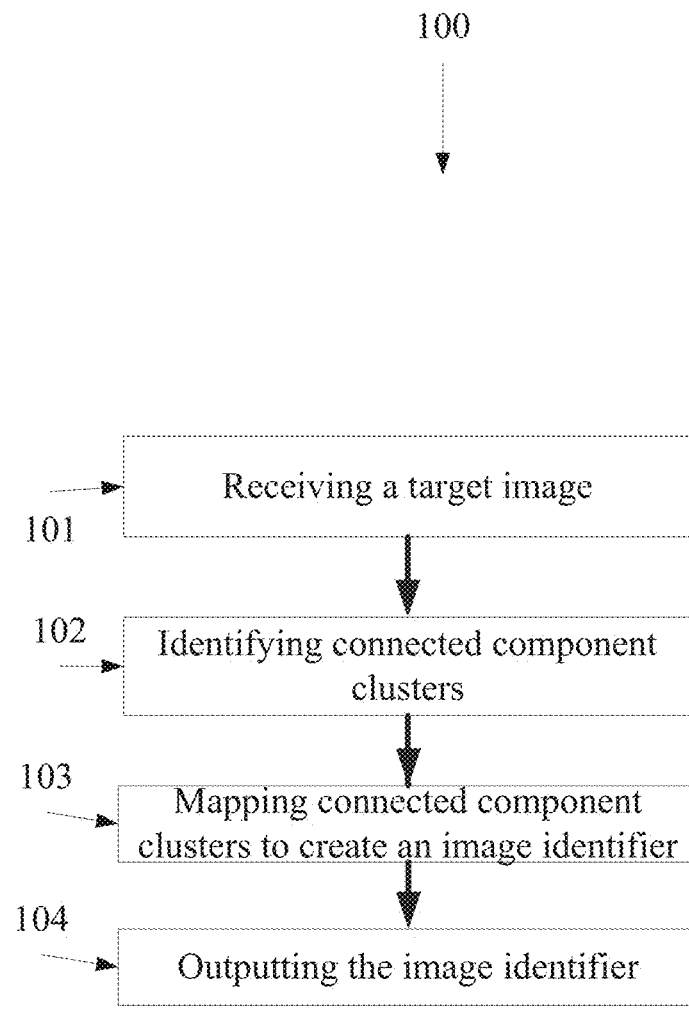

Reference is now made to FIG. 1, which is a flowchart 100 of generating an image identifier for an image, such as a color image or grayscale image, by mapping a plurality of connected component clusters, also referred to herein as blobs in the image, according to some embodiments of the present invention.

Figure 2:
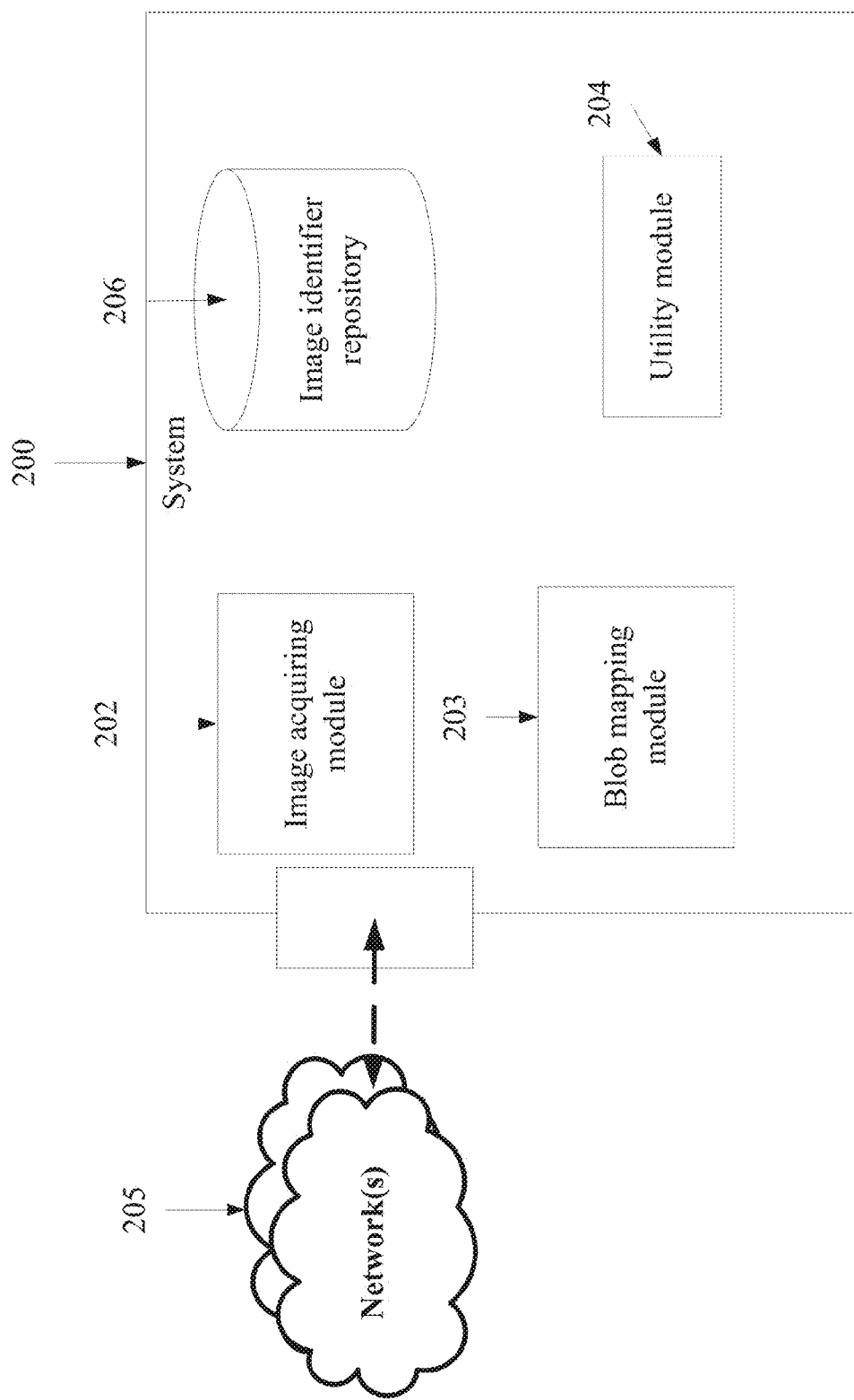

Reference is also made to FIG. 2, which is a schematic illustration of a system 200 of generating an image identifier for an image, for example by implementing FIG. 1, according to some embodiments of the present invention. The system 200 is optionally a processor based unit, such as a network node, for example a server and/or a client terminal which includes a processor 201 for calculations. The system includes an image acquiring module 202 for receiving an image, for example from another network node via a network 205 and/or network documents which are available over the network 205, for example by crawling various websites. The system 200 further includes a blob mapping module 203 for generating image identifiers by mapping blobs, for example as described below. The image identifiers are optionally stored in a repository 206.

The system 200 further includes one or more utility modules 204 which uses the blob mapping module 203 and/or the repository 206 for matching image(s) to a queried image, for compressing image data, for verifying authenticity of images, and/or the like, for example as described below.

First, as shown at 101, a target image is received, for example using the image acquiring module 202.

Now, as shown at 102, a plurality of connected component clusters of pixels (i.e. blobs) are identified in the target image, for example by the blob mapping module 203. Each cluster includes a group of neighboring pixels with one or more similar properties, for example common and/or similar color and/or hue value, for instance a color and/or hue value in a certain range. For brevity, these values are referred to herein as pixel values. Optionally, a neighborhood rule is used to relate pixels to clusters. Optionally, the neighborhood rule is a North-East-West-South (NEWS) neighborhood rule in which two pixels are included in the same cluster if both the pixels are in the same class (e.g. having common or similar pixel values) and the pixels are neighbors according to the neighborhood rule. NEWS neighbors share a pixel boundary on the north, east, west, or south (upper boundary, left boundary, right boundary, or bottom boundary.

Optionally, the pixel values are uniformly quantized. This may be used to reduce the number of pixel values in the target image to a desirable size.

In an exemplary grayscale image identification process, connected components of pixels in a color image are clustered according to a common color value range. Optionally, pixel values are RGB values and the clustering is performed according to the color values red (R), green (G) and blue (B) values. For example, each color value is divided to two value ranges so that clustering 8 different types of clusters may be identified in the target image. In such embodiments, the blob partitioning scheme depends on the initial setting of the number of colors and it is also weakly dependent on the image resolution.

Figure 3A:
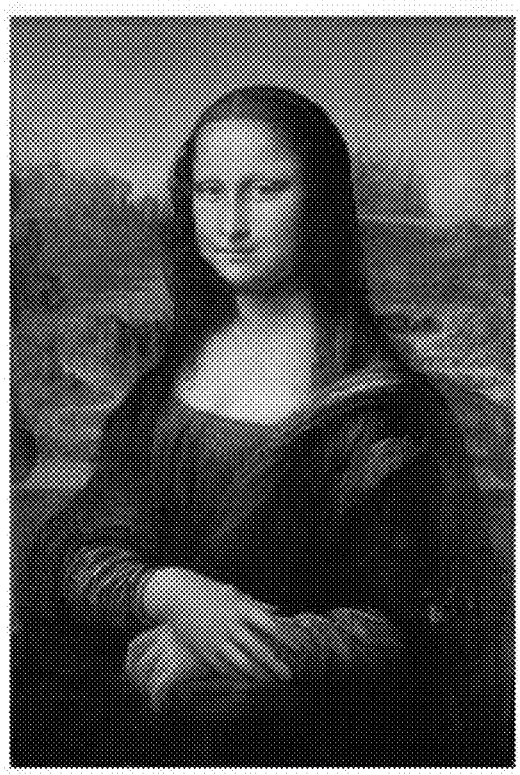
Figure 3B:
Figure 4A:
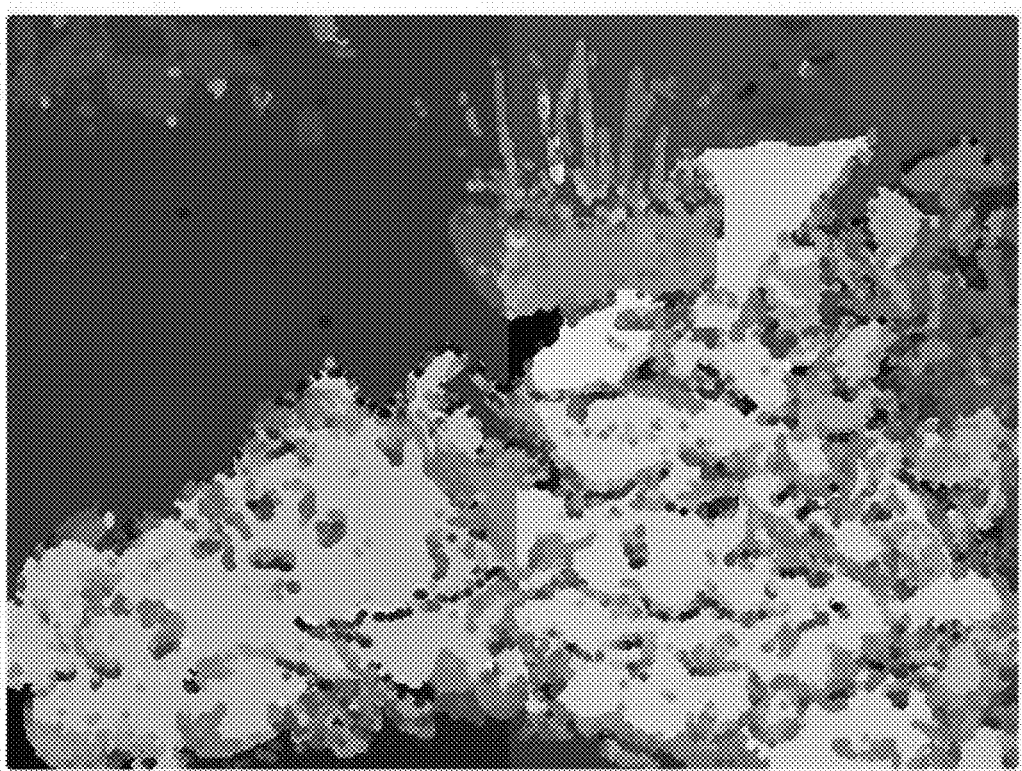
Figure 4B:

For example, FIGS. 3A-3B is a set of images that respectively includes a painted picture and an image of 8-colors (8 level pixel values) connected component clusters generated from the painted picture, according to some embodiments of the present invention. Another example is depicted in FIGS. 4A-4B which is a set of images that respectively includes an image captured by a digital camera and an image of 8-colors (8 level pixel values) connected component clusters generated from the image, according to some embodiments of the present invention.

Figure 5A:
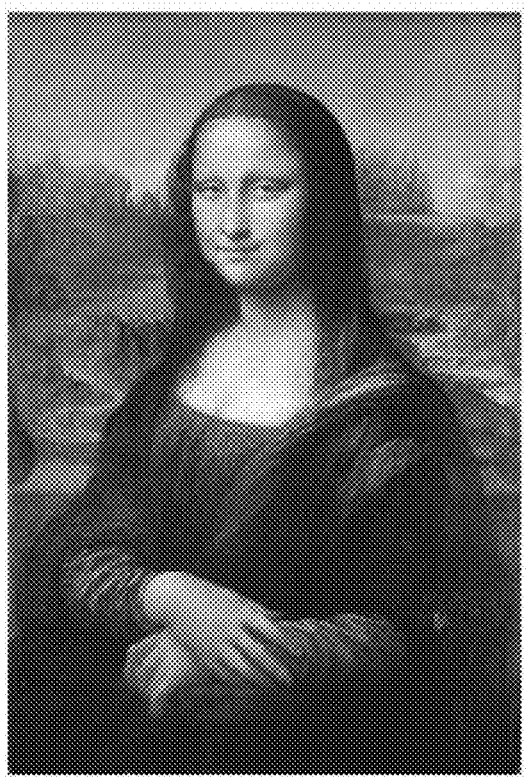
Figure 5B:

The minimal number of pixels per blob is respectively 10 and 1. Another example is depicted in FIGS. 5A and 5B which is a set of a grayscale image and an image of 4-level pixel value connected component clusters of the grayscale image generated according to some embodiments of the present invention.

Now, as shown at 103, some or all of the connected component clusters are mapped to create an image identifier of the target image.

Optionally, only connected components with more than a certain number of pixels are mapped. For example, in use, connected component clusters may be ordered in a matrix or any other dataset according to their size, namely their associated number of pixels. In such an embodiment, only the top of the list may be mapped, for example top 3, 8, 10, 15, and 20 or any intermediate or larger number of blobs.

The image identifier is generated by a plurality of objects which are mapped to reflect the following connected component cluster properties:

a center of gravity value—the gravity center of the connected component cluster calculated as the arithmetic mean of the connected component cluster's pixel coordinates;

a clustering pixel value—a representative color and/or hue of the connected component cluster; and a cluster size value—the number of pixels in the connected component cluster.

For example, each connected component cluster is mapped in a space that matches the image space of the target image, for example as a visual object, such as a circular object centered according to the gravity center value. The circular object is optionally colored to match the clustering pixel value and having a radius that is proportional to cluster size value. In such embodiments, the image identifier is a map that includes a plurality of visual objects is generated where the location, color, and size of each visual object is indicative of the center of gravity, the clustering pixel value, and the relative size of the respective connected component cluster.

Now, as shown at 104, the image identifier is outputted, for example for as in an entry of catalog and/or an index, with reference to the target image and/or as a record that is matched with such an index or a catalog to identify similar images having similar image identifiers. The image identifier is optionally outputted as a vector or a matrix of values that later may matched and/or rendered visually. The image identifier may be outputted as an image fingerprint, for example as a barcode that later can be read using a scanner for identifying the target image.

Figure 6:
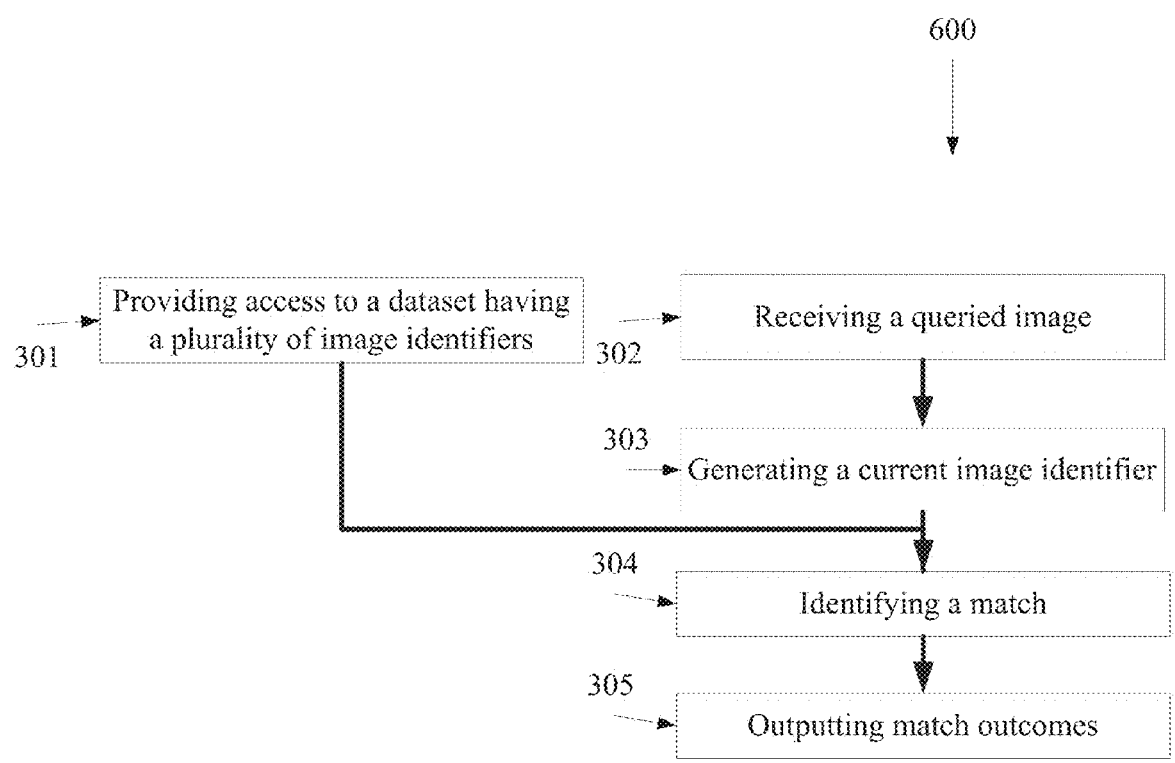

For example, reference is now made to FIG. 6, which is a flowchart 600 of a method of identifying one or more images which are similar to a selected image, for example a queried image designated in a search query, according to some embodiment of the present invention. In such embodiments, the queried image is processed to generate an image identifier that is matched with image identifiers which are used as fingerprints of images in a certain database, which may be local or distributed (e.g. a database of images, images from any number of web documents distributed in a number of different network nodes, and/or the like) for image retrieval. In such an embodiment, images are processed to create a set of image identifier entries, for example an index and/or a list. Each entry includes an image identifier that is optionally generated as described in FIG. 1, for example by a managing search engine. The index is used to find a match between one or more of the indexed images and an image received a search query or otherwise selected. First, as shown at 301, an access to a dataset having a plurality of image identifiers each associated with one of a plurality of images is provided, for example access to a dataset managed by a search engine and stored in a repository that is connected thereto, such as 206. As shown at 302, a query for matching a certain target image and one or more of the indexed images is received, for example at the search engine, for instance as a search query received from another network node, such as a client terminal.

As shown at 303, a current image identifier associated with the target image is generated. The current image identifier is optionally generated as described in FIG. 1, for example by the search engine as a utility module. This allows, as shown at 304, to identify a match between the current image identifier and one or more of the identifiers in entries of the repository. Optionally, a match is found when the current image identifier is identical to one or more image identifiers and/or similar to one or more image identifiers, for example having values in a common range. The computational complexity of each match is substantially reduced in relation to image matching as each object mapped in the image identifier entry includes only a center of gravity value, a clustering pixel value, and a cluster size value, each may be represented by byte.

Now, as shown at 305, one or more of the images which are associated with matched identifiers or references thereto are outputted, for example in response to the search query.

The image identifier of a certain image is substantially similar to compressed versions thereof. Therefore, the index of image identifiers may be used for identifying a match between images without requiring identicalness between their compression level. It should be noted that a number of copies of the same image or a number of different versions of the same image, for example in different compression rates, may be indexed by similar and separately generated image identifiers.

The image identifier of a certain image is substantially similar to filtered versions thereof, for example color filters, texture filters, exposure filters and/or the like. Therefore, the index of image identifiers may be used for identifying a match between an image and a filtered version thereof. For example, reference is also made to FIGS. 7A-7D which are, respectively, an indexed image, a graphical representation of an image identifier extracted from the indexed image, for example using the method depicted in FIG. 1, a queried image that is a blurred version of the indexed image, and an image identifier extracted from the queried image. As shown by FIG. 7B and FIG. 7D, the image identifiers are similar although the blur in FIG. 7C from which FIG. 7D is originated is significant.

Optionally, the search of one or more matched images which are similar to the queried image is performed only among entries which include objects having a common center of gravity value, a common clustering pixel value, or a common relative size value that match the respective value of a respective object of the target image. For example, a match is searched for entries whose first objects are matched with objects in the queried image. Such an operation may reduce the number of matched entries substantially.

Figure 8B:
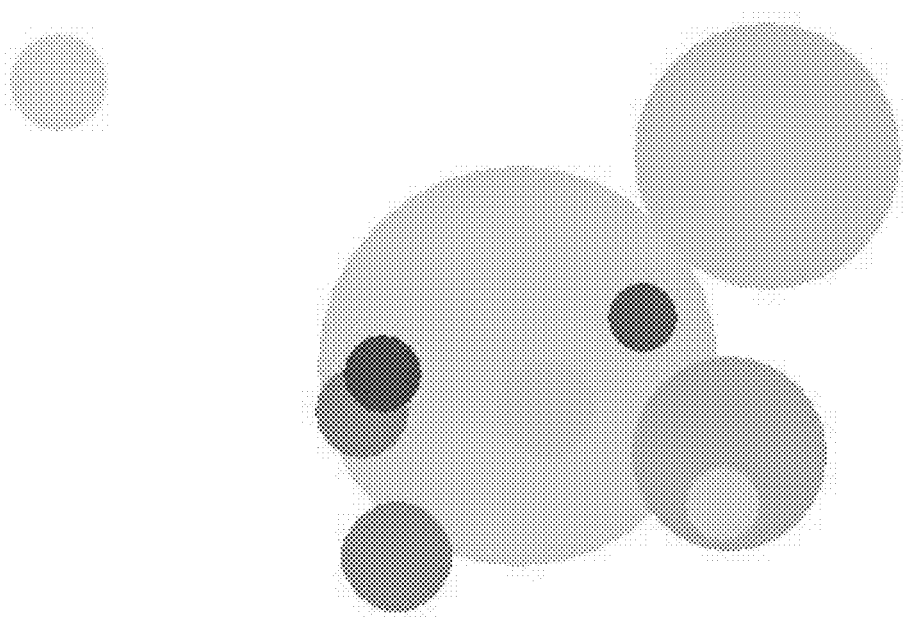
Figure 8A:
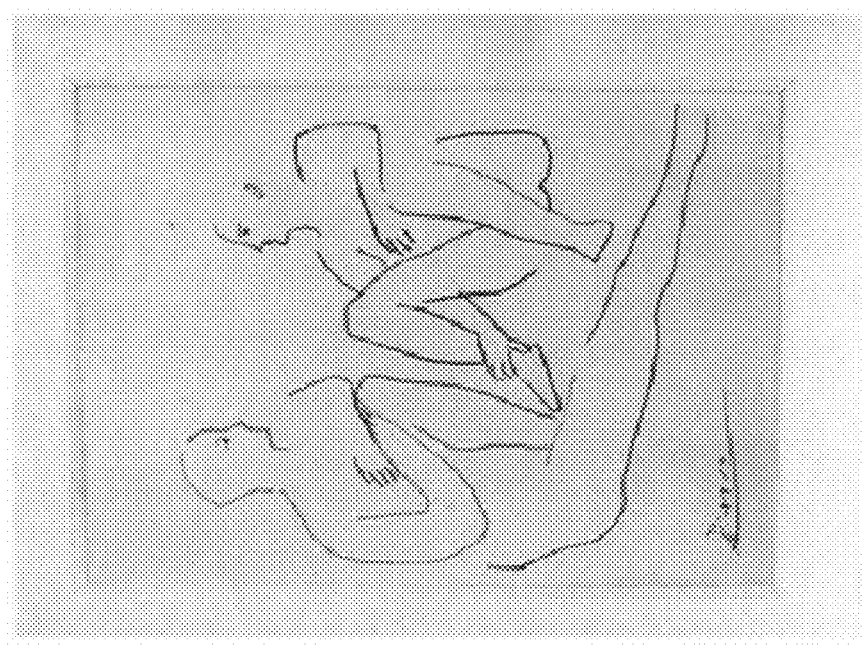

For example FIG. 8A and FIG. 8B depict a grayscale drawing and a graphical representation of an image identifier with a plurality of circular objects, according to some embodiments of the present invention. In this conversation only some of the clusters were mapped (e.g. 2 to 12) were considered and the number of minimal pixels per cluster is set to 10. Optionally, the radius of the circular objects is magnified while ratio between sizes of different objects is maintained.

Figure 9:
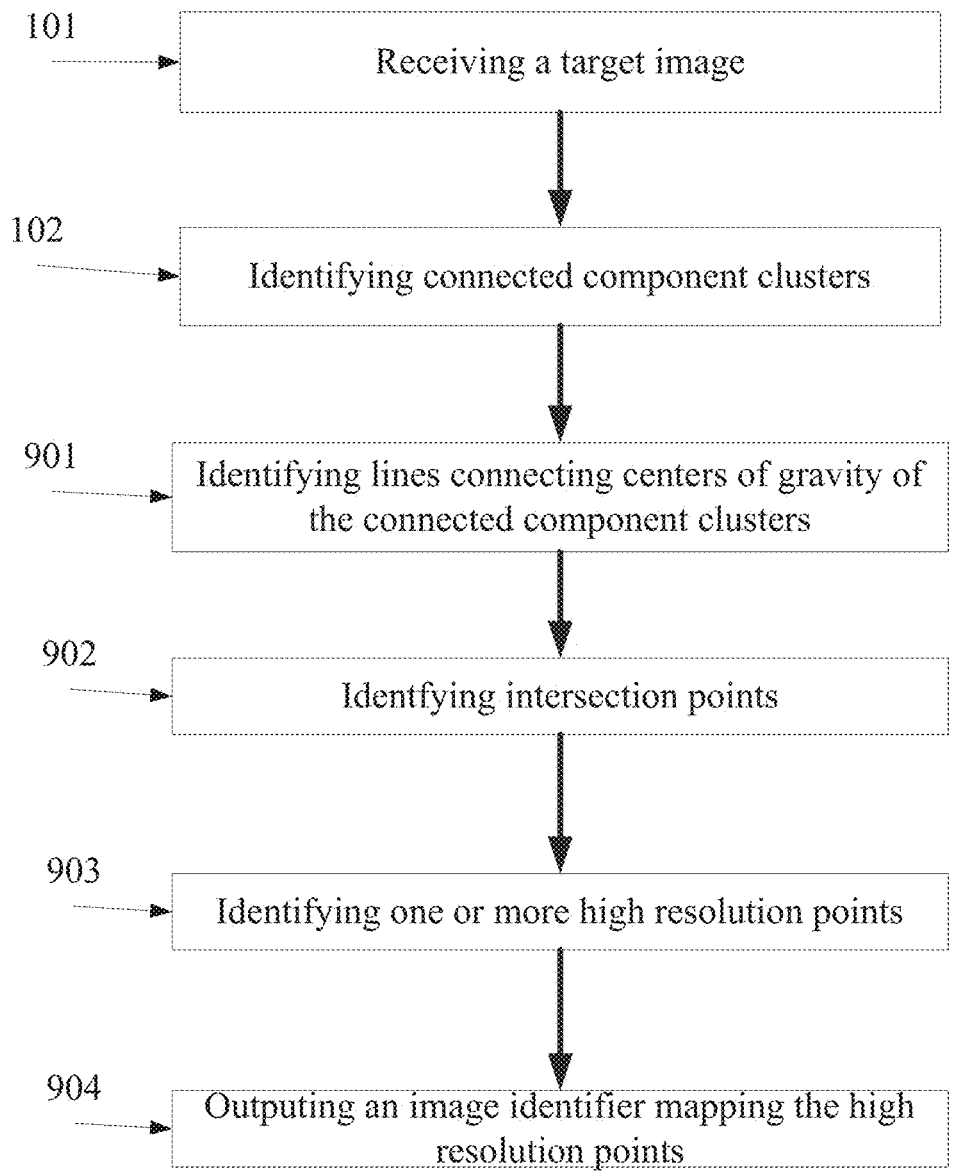

Reference is now made to FIG. 9 that is a flowchart of another method of generating an image identifier from connected component clusters of pixels having one or more common properties, according to some embodiments of the present invention. 101 and 102 are as described above; however, in FIG. 9, 901-904 describe how the connected component clusters are used to identify a set of high resolution points in different locations in the imaged area of the image. First, as shown at 801, lines connecting between each pair of centers of gravity of the connected component clusters are identified. In order to reduce computation complexity, only some of the connected component clusters are used.

Then, as shown at 902, a plurality of points wherein two or more lines are intersected are selected and referred to herein as intersection points.

Figure 11A:
Figure 11B:
Figure 10:
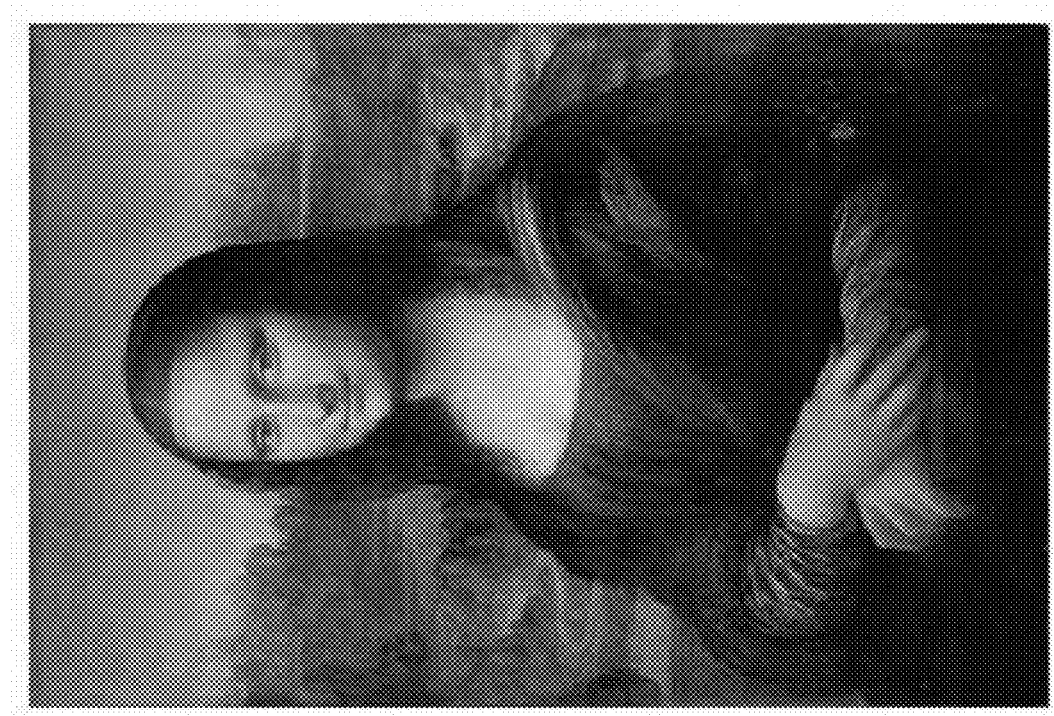

Optionally, as shown at 903, a group of one or more intersection points is selected, for example a certain amount of intersection points with the highest number of intersecting lines, for example 5, 10, 15, and 20 or any intermediate or larger number. These points are referred to herein as high resolution points. For example, FIG. 10 depicts a high resolution point with the highest number of intersections in a painting. Another example is depicted in FIGS. 11A and 11B which depict a high resolution point with the highest number of intersections in an image captured using a digital camera and a set of high resolution points with the highest number of intersections in this image.

As shown at 904, the high resolution points are outputted as an image identifier of the image. For search and retrieval schemes, the above derived set of high resolution points may be used in various embodiments, for example similarly to the plurality of circular objects which are described above.

It should be noted that the image identifier that is based on the set of high resolution points is relatively sensitive to changes in the image and therefore may be used as for identifying an exact match between images. It should be noted that the exact match between image identifiers which are based on high resolution points may be an essential condition but insufficient for determining an identity and therefore may by use for filtering potential images for a match and/or as verification means. In such embodiments, slight difference, for example of several pixels, in the locations of the high resolution points in a queried image and in a matched image indicates that the probability that the images are identical is very low. If, on the other hand, there is an exact match of the high resolution points, it is very likely that the images are identical in texture (not necessary in colors). This method may safely verify that two images are different.

According to some embodiments of the present invention, all or some of the lines connecting between one or more of the high resolution points, for example the highest resolution point(s) and centers of gravity which lines therefrom are intersected at the highest resolution point(s) are added to the image identifier, each optionally with the color of the respective connected component cluster. Optionally, a visual property of the line, for example it's thickness, is set to be proportional to the number of pixels of this respective connected component cluster. For example, FIG. 12A and FIG. 12B are a painting and an image identifier that is derived from the painting, according to some embodiments of the present invention. In such embodiments, the image identifier is an outcome of the center of gravity value of each connected component cluster (i.e. the angle of the respective line), a clustering pixel value of each connected component cluster (i.e. the color of the respective line) and optionally the cluster size value of each connected component cluster (i.e. the thickness of the respective line). Optionally, the image identifier is represented as a unique set of values that allows constructing a visual representation having colored lines as described above and depicted in FIG. 12B. FIG. 12D depicts an image identifier generated from a similar image with different colors, for example the image depicted in FIG. 12C. In some embodiments of the above described barcode scheme, depending on the required application, a high resolution point maybe replaced by another point of interest in the image, for example a frame coordinate center, a gravity center that is associated with some specific blob of interest and/or the like.

It should be noted that the colored lines may be arranged in any other arrangement. For example, as depicted in FIGS. 13B and 13D are image identifiers having lines which are generated from the images depicted in FIGS. 13A and 13C. The lines in these image identifiers are ordered according to the size of the respective connected component clusters, from the largest to the smallest. The length and color of each line is as described above with regard to the image polar barcode (the distance between a certain center of gravity and a selected high resolution point and the color is indicative of the respective clustering pixel value). This arrangement of lines resembles to currently known barcodes. FIG. 14B is an image identifier with gray level lines ordered according to the size of a respective cluster in grayscale image depicted in FIG. 14A.

According to some embodiments of the present invention, the above described image identifiers, for example based on the visual objects and/or lines connecting high resolution point(s) with centers of gravity and/or lines representing values of different connected component clusters, also referred to herein as image line barcodes, are printed and/or presented with images and/or with relation to images. For example, the image identifiers are used as unique barcodes for identification.

According to some embodiments of the present invention, a queried image is matched with a plurality of image identifiers that comprise a plurality of groups of image identifiers generated from an analysis of images of scene where each image is captured from a different angle. In such a manner, each group can provide a three dimensional (3D) imaging of the scene. In such an embodiment, the matching between a queried image and a certain image allows detecting a group of images that depict a scene from different points of view. FIGS. 15A and 15B illustrate these embodiments, showing two images of the same scenery taken from different viewpoints using the same camera. In each figure an overlay depicting the outcome of a blob-to-circular transformation of a respective image is depicted is. FIG. 15A clearly shows (upper right) a blue blob whose radius is substantially decreased relative to a respective blob at FIG. 15B. Similarly, a large brown blob located at the lower right part of FIG. 15A is replaced by a large blue blob presenting a sky patch. It should be noted that in both images the left part remains unchanged while in the blob to circular transformation and only the right part is changed due to a view point change.

Optionally, a catalog of image identifiers is used for identifying imaged physical objects. The catalog includes a plurality of entries arranged as a sequence of image identifiers which are derived from using the above described process, for example as described with reference to FIG. 1. The arrangement of the catalog is set so as to optimally be searched for an external query, for example in a lexicographical ordering. The image identifier would then be matched by the entries in the catalog and the lexicographical ordering of the entries allows identifying one or more images which are similar to the queried image by identifying the image identifiers in the catalog which are in the closest distance to the image identifier of the queried image.

Each image identifier is represented by a point in an n-dimensional vector space, where n is a number of connected component clusters.

Optionally, a device having an image sensor and a processor is used as an image identifier reader. The device is optionally a portable device, optionally handheld, such as a designated reader and/or a camera based client terminal such as a Smartphone, a tablet, and/or a wearable reader, for example camera enhanced glasses. In use, the portable device may be used to capture an image, for example from a captured image sequence, and to generate the image identifier thereof, for example using an image identifier module. This image identifier may now be matched, using the image identifier module, with a database of image identifiers associated with references or descriptions of respective images to identify a match. For example, FIG. 16B is an exemplary barcode, image identifier, generated from the image depicted in FIG. 16A, according to some embodiments of the present invention. Based on this match, the image may be identified, for example similarly to the described with reference to FIG. 6. This device may be used for identifying an image or a physical object associated with barcodes generated as described above. The device may be a Smartphone with an application for processing the image and matching the generated image identifier. The device includes a presentation unit, such as a screen to indicate the match, for example by presenting the matched content and/or references thereto.

According to some embodiments of the present invention, values of objects, lines, or other elements of an image identifier, for example the center of gravity value, the clustering pixel value, and the cluster size value related to each element, are transformed to a unique number comprising of a multiplication of prime numbers. In such embodiments, the image is associated with a unique number, for example a multiplication of prime numbers, for instance a Goedel number.

In another example, in an image identifier that includes a set of lines, for example as depicted in FIG. 10B, each line, for example each ray emanated from the high resolution point, is transformed into a factor of prime numbers such that all the rays are represented by different prime multiplications. Consequently, a multiplication of all the numbers representing all the rays yields a unique Goedel number. In such case searching for an image is equivalent to searching Goedel numbers.

Optionally, the image identifier, for example the unique number, or a reference to the image identifier, for example a link, is added to the metadata of a file containing a copy of the image from which it is derived. Additionally or alternatively, the image identifier, for example the unique number, or a reference to the image identifier, for example a hush table value, is added to the name of a file containing a copy of the image from which it is derived. Optionally, the added image identifier(s) allows detecting similarities between images based on metadata or file name analysis, for instance without scanning and/or reading media data from the respective the files.

A convenient and effective such blob formation method associated with a colored image is the mapping of each colored space R G and B into two possible colors so that the image colored values would comprise of 8 colors. From the 8 colors image matrix, depending on setting of the minimal number of pixels defining a blob, various blobs are constructed and are ordered by their associated number of pixels.

It is worth noting that the blob partitioning scheme depends on initial setting of the number of colors and on the image resolution.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a unit, a module, and a processor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system of creating an image identifier of a target image, comprising:
   a memory storing a code;
   a processor adapted for executing said code, wherein said code comprising:
   code instructions for providing a target image;
   code instructions for identifying a plurality of connected component clusters in said target image, each said connected component cluster comprises a plurality of neighboring pixels having at least one common property,
   code instructions for calculating a center of gravity for each said connected component cluster, and
   code instructions for generating an image identifier of said target image by using a plurality of elements to map said connected component clusters in a space, each said element represents a respective said at least one common property, a respective said center of gravity, and a size which corresponds with a number of said plurality of neighboring pixels of said respective said connected component cluster.

2. The system of claim 1, wherein said image identifier is a graphical representation of said target image wherein each said element is represented as an object located in relation to other objects according to the location of a respective said center of gravity, having a visual size which corresponds with said number of neighboring pixels and colored according to said at least one common property.

3. The system of claim 2, wherein each said object is a circular object centered around said respective center of gravity, having a radius which corresponds with said number of neighboring pixels, and colored according to said respective at least one common property.

4. The system of claim 1, said at least one common property is a color pixel value.

5. The system of claim 1, said at least one common property is a grayscale pixel value.

6. The system of claim 1, wherein said code further comprising code instructions for instructing printing said image identifier; wherein said printed imager identifier is a fingerprint of said target image.

7. The system of claim 1, further comprising a storage for storing said image identifier as an entry in an index; wherein said code further comprising code instructions which are executed by said processor for matching said image identifier with another image identifier received in a search query and retrieving said target image is match between said image identifier and said another image identifier.

8. The system of claim 1, wherein said code instructions for generating comprises code comprises instructions for uniformly quantizing pixel values in said target image.

9. The system of claim 1, wherein said image identifier is a graphical representation of said target image wherein each said element is represented as a line object located to connect each said connected component cluster with a selected point in said target image, said line having a visual size which corresponds with said number of neighboring pixels and colored according to said at least one common property.

10. The system of claim 1, wherein said generating comprises multiplying values of each said element to generate a Goedel number and using said Goedel number as said image identifier.

11. The system of claim 1, wherein said code further comparing code instructions which are executed by said processor for adding said image identifier to at least one of metadata and a file name of a file containing said target image.

12. The system of claim 1, wherein said target image is an image stored to be rendered when a webpage is loaded wherein said code comprising code instructions which are executed by said processor for identifying said target image while crawling a plurality of websites.

13. A device of identifying an object, comprising:
a repository which includes a dataset having a plurality of image identifiers each associated with one of a plurality of images;
an image sensor which captures a target image;
a memory storing a code;
a processor adapted for executing said code, wherein said code comprising:
code instructions for generating a target image identifier associated with said target image and identifies a match between said target image identifier and at least one of said plurality of image identifiers;
code instructions for generating an indication according to said match;
wherein each said image identifier includes a plurality of elements indicative of a plurality of connected component clusters, each said connected component cluster comprises a plurality of neighboring pixels having at least one common property, each said element maps for one of said respective plurality of connected component clusters, a center of gravity, a respective said at least one common property and a size which corresponds with a number of said plurality of neighboring pixels.

14. The device of claim 13, wherein said device is a handheld device having said code installed as an application.

* * * * *